US012779569B2

(12) United States Patent
Hsue et al.

(10) Patent No.: US 12,779,569 B2
(45) Date of Patent: Nov. 3, 2026

(54) CHANNEL MACHINING EQUIPMENT

(71) Applicant: National Kaohsiung University of Science and Technology, Kaohsiung City (TW)

(72) Inventors: Wen-Jeng Hsue, Kaohsiung City (TW); Yi-Da Pan, Kaohsiung City (TW)

(73) Assignee: NATIONAL KAOHSIUNG UNIVERSITY OF SCIENCE AND TECHNOLOGY, Kaosiung City (TW)

( * ) Notice: Subject to any disclaimer, the term of this patent is extended or adjusted under 35 U.S.C. 154(b) by 1057 days.

(21) Appl. No.: 17/891,854

(22) Filed: Aug. 19, 2022

(65) Prior Publication Data

US 2023/0059939 A1 Feb. 23, 2023

(30) Foreign Application Priority Data

Aug. 19, 2021 (TW) ................................ 110130752

(51) Int. Cl.
*B23H 7/26* (2006.01)

(52) U.S. Cl.
CPC .................................... *B23H 7/265* (2013.01)

(58) Field of Classification Search
CPC . B23H 1/04; B23H 7/26; B23H 7/265; B23H 7/30; B23H 9/14; B23H 7/18; B23H 7/28; B23H 1/00; B23H 7/102
USPC ............ 219/69.15, 69.16, 69.19, 69.12, 69.2
See application file for complete search history.

(56) References Cited

U.S. PATENT DOCUMENTS

| | | | | |
|---|---|---|---|---|
| 5,958,195 A | 9/1999 | Lorincz et al. | | |
| 6,547,950 B1 * | 4/2003 | Lorincz | ..................... | C25F 3/16 205/672 |
| 8,397,374 B2 * | 3/2013 | Sheu | ........................ | B23H 9/00 219/69.12 |

FOREIGN PATENT DOCUMENTS

| | | |
|---|---|---|
| CN | 112548246 A | 3/2021 |
| JP | H0343122 A | 2/1991 |

OTHER PUBLICATIONS

Official Action issued by Taiwan Intellectual and Property Office on Jan. 18, 2022.

* cited by examiner

*Primary Examiner* — Phuong T Nguyen
(74) *Attorney, Agent, or Firm* — LANWAY IPR SERVICES; Chun-Ming Shih

(57) ABSTRACT

A channel machining equipment and a channel machining method allow a wall of an internal curved channel in a workpiece to be conducted. A set of traction lines and guiding bodies are to support the EDM electrode and thus allow an electrode linked with the guide mechanism to substantially move in a central portion of the curved channel to optimize an EDM effect on the wall of the channel. Therefore, a precision machining process (such as grinding, EDM, and so on) can be conducted on the internal curved channel of the workpiece to make it have satisfactory wall roughness and shape precision according to predetermined standards, thereby solving the problem of failure in effectively machining the wall of the curved channel in the workpiece in the prior art.

9 Claims, 11 Drawing Sheets

CHANNEL MACHINING EQUIPMENT

CROSS-REFERENCE TO RELATED APPLICATIONS

This application claims the priority of Republic of China Patent Application No. 110130752 filed on Aug. 19, 2021, in the State Intellectual Property Office of the R.O.C., the disclosure of which is incorporated herein by reference.

BACKGROUND OF THE INVENTION

Field of the Invention

The present invention relates to channel machining equipment and a channel machining method for conducting electrical discharge machining (EDM) on a wall of an internal curved channel in a workpiece.

Descriptions of the Related Art

A workpiece, such as a mold or special part, is usually formed with straight internal channels simply due to limitations of the existing machining technology that is not capable of performing a desirable machining process (such as grinding, EDM, and so on) on a wall of a curved channel rather than a straight channel. This means the current technology, unfortunately, can only make curved channels with unsatisfactory wall roughness and shape/size preciseness in the workpiece.

Therefore, in order to solve the above problem, it is an important task in the art to propose channel machining equipment and a channel machining method for effectively machining a wall of a curved channel in a workpiece.

SUMMARY OF THE INVENTION

In view of the above drawbacks in the prior art, the present invention provides a channel machining equipment for performing electrical discharge machining (EDM) on a curved channel in a workpiece, the channel machining equipment including: an electrode for performing an EDM process and having a first end and a second end; a first guide close to the first end of the electrode; a second guide close to the second end of the electrode; a traction mechanism for serially connecting the first guide, the second guide and the electrode; an actuating mechanism serially connected to the traction mechanism; and a power supply serially connected to the traction mechanism; wherein, when the electrode performs the EDM process, the actuating mechanism provides kinetic energy for the traction mechanism to allow the traction mechanism to perform a towing process that tows the first guide, the second guide and the electrode to move in the curved channel, wherein when the traction mechanism performs the towing process, the first guide or the second guide is supported by a wall of the curved channel to drive the electrode to substantially move along a central portion of the curved channel, and simultaneously the power supply provides electricity for the electrode via the traction mechanism to make the electrode substantially stay in the central portion of the curved channel to perform the EDM process on the wall of the curved channel.

Preferably, in the channel machining equipment said above, the traction mechanism includes a first traction line and a second traction line, wherein the first traction line is connected to the first end of the electrode, and the second traction line is connected to the second end of the electrode; wherein when the electrode performs the EDM process, the first traction line provides a traction force at the first end of the electrode or the second traction line provides a traction force at the second end of the electrode to tow the electrode to move back and forth in the curved channel.

Preferably, in the channel machining equipment said above, the first traction line or the second traction line is an electric wire, and the power supply provides electricity for the electrode via the first traction line or the second traction line.

Preferably, in the channel machining equipment said above, the traction mechanism further includes a retaining structure for keeping the first traction line's traction force and the second traction line's traction constant.

Preferably, in the channel machining equipment said above, the traction force retaining structure includes a pulley set and an anti-reverse mechanism, wherein the pulley set includes a movable pulley and at least one fixed pulley, and the anti-reverse mechanism includes a ratchet, wherein the anti-reverse mechanism and the movable pulley are connected to the actuating mechanism to have linked movement; wherein when the actuating mechanism has its kinetic energy make the first traction line moved by a predetermined distance, the movable pulley moves along with the actuating mechanism, and the fixed pulley changes an extension direction of the second traction line to make the second traction line moved by the predetermined distance, and the anti-reverse mechanism stops reverse retraction of the second traction line, so as to allow an overall length of the first and second traction lines to substantially remain constant and keep the traction forces of the first and second traction lines substantially constant.

Preferably, in the channel machining equipment said above, the first guide, the second guide or the electrode is a spherical block or a conical block.

Preferably, in the channel machining equipment said above, further including an EDM fluid providing module for providing an EDM fluid, wherein the first guide includes a first runner for the EDM fluid to flow through, and the second guide includes a second runner for the EDM fluid to flow through.

Preferably, in the channel machining equipment said above, the electrode further includes at least one groove structure on its surface, wherein the groove structure has a push surface for allowing the EDM fluid to push the electrode to rotate in the curved channel when the EDM fluid flows in the groove structure, to allow the electrode to achieve a uniform EDM effect on the wall of the curved channel in the workpiece.

Preferably, in the channel machining equipment said above, the electrode further includes an eccentric connection portion at an eccentric location, wherein the traction mechanism is connected to the eccentric connection portion that allows the traction mechanism to eccentrically tow the electrode to move in an increased range within the curved channel, to enlarge an EDM range where the electrode performs the EDM process on the wall of the curved channel in the workpiece.

Furthermore, the present invention also provides a channel machining method for performing electrical discharge machining (EDM) on a curved channel in a workpiece; the channel machining method includes the steps of: providing an electrode for performing an EDM process; and providing a guide mechanism close to the electrode; wherein, when the electrode performs the EDM process, the guide mechanism is supported by a wall of the curved channel to drive the electrode to substantially move along a central portion of the curved channel, to make the electrode substantially stay in the central portion of the curved channel to perform the EDM process on the wall of the curved channel.

In summary, the present invention provides a channel machining equipment and a channel machining method, which allow a wall of an internal curved channel in a workpiece to support a guide mechanism and thus allow an electrode linked with the guide mechanism to substantially move in a central portion of the curved channel to optimize an EDM effect on the wall of the curved channel. Therefore, a precision machining process (such as grinding, EDM, and so on) can be conducted on the internal curved channel of the workpiece to make it have satisfactory wall roughness and shape preciseness according to predetermined standards, thereby solving the problem of failure in effectively machining the wall of the curved channel in the workpiece in the prior art.

BRIEF DESCRIPTION OF THE DRAWINGS

Technical features of channel machining equipment and a channel machining method according to the present invention are described with reference to the following drawings.

DETAILED DESCRIPTION OF THE PREFERRED EMBODIMENT

Figure 1:
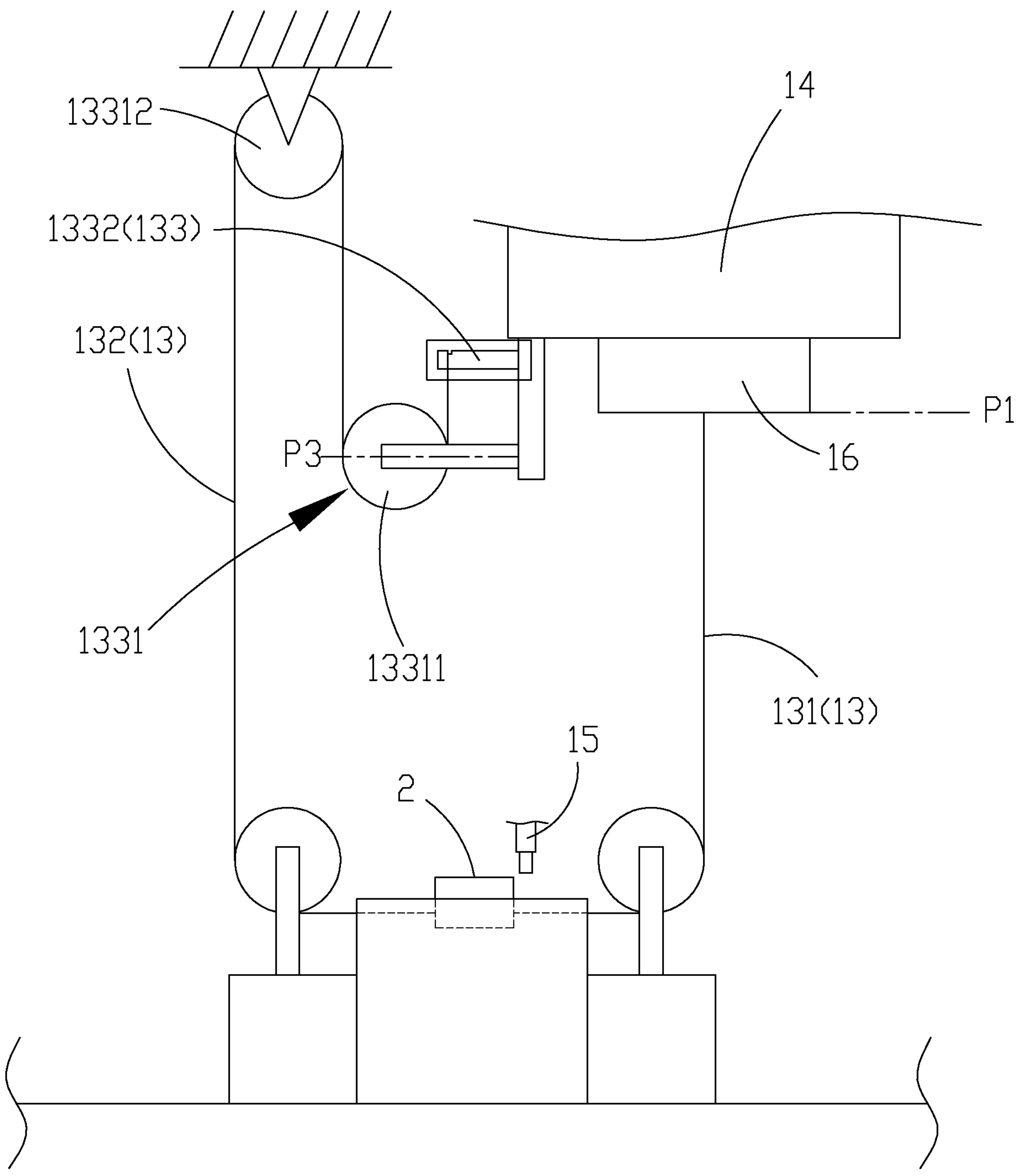
FIGS. 1 to 2 are schematic diagrams showing usage statuses of the channel machining equipment according to the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The present invention provides a channel machining equipment and a channel machining method, which can perform electrical discharge machining (EDM) on a wall of an internal curved channel in a workpiece to allow the wall to undergo a machining process such as grinding, EDM, and so on, so as to make the curved channel have satisfactory wall roughness and shape/size preciseness according to predetermined standards.

Technical features of the present invention are described with reference to FIGS. 1 to 11.

Figure 2:
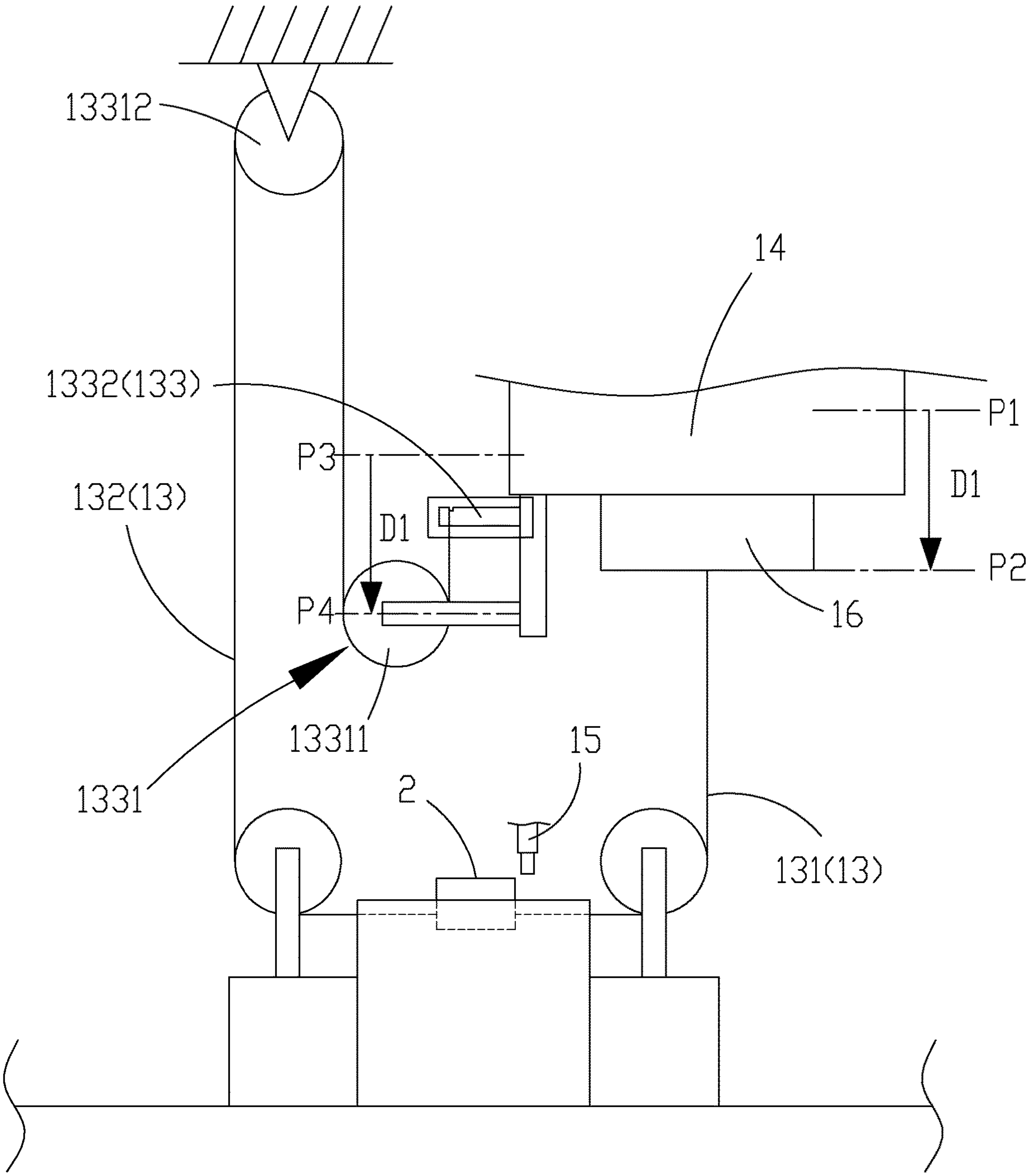
Figure 3:
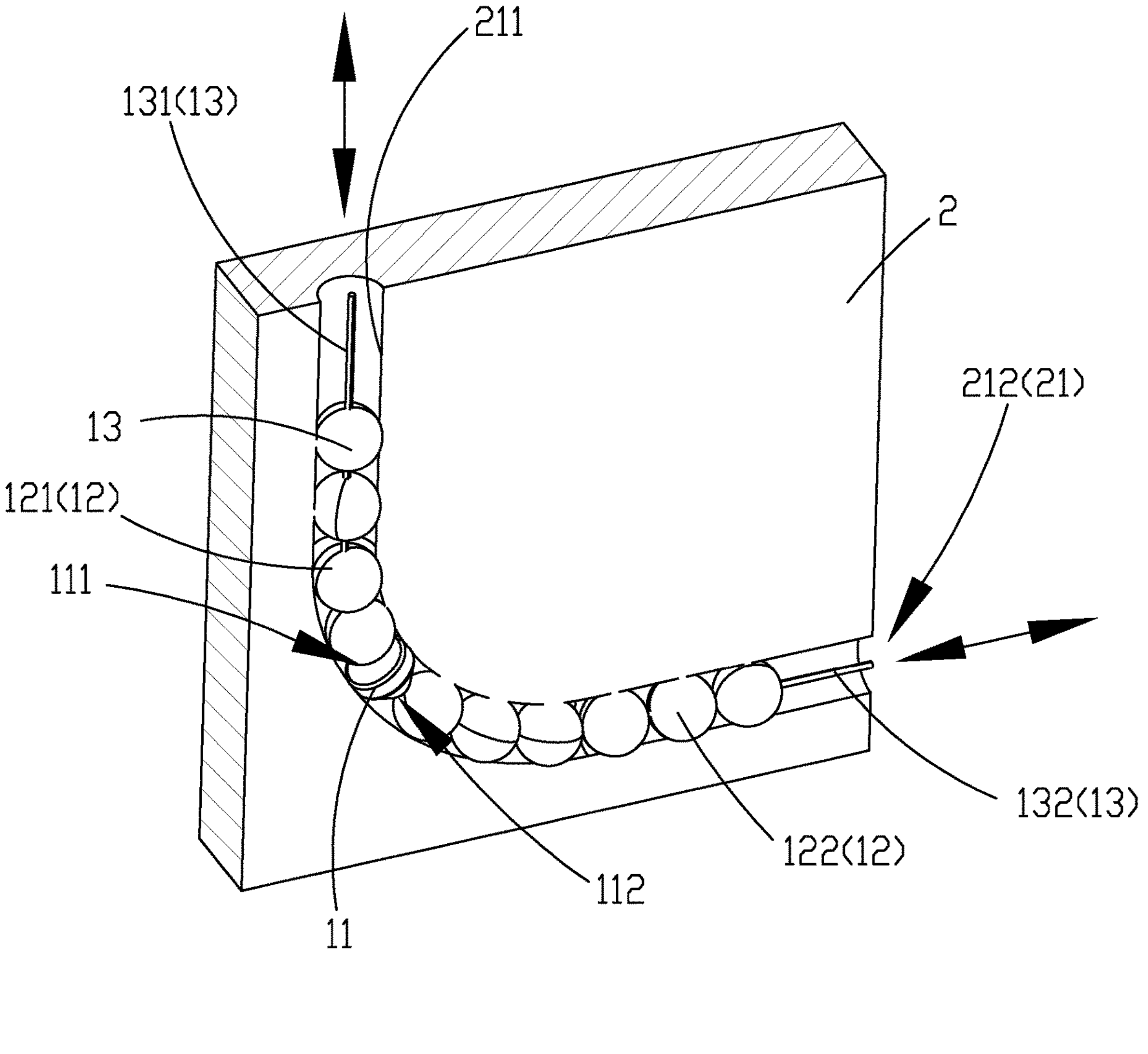
FIG. 3 is a schematic diagram showing how the channel machining equipment according to the present invention works.
Figure 4:
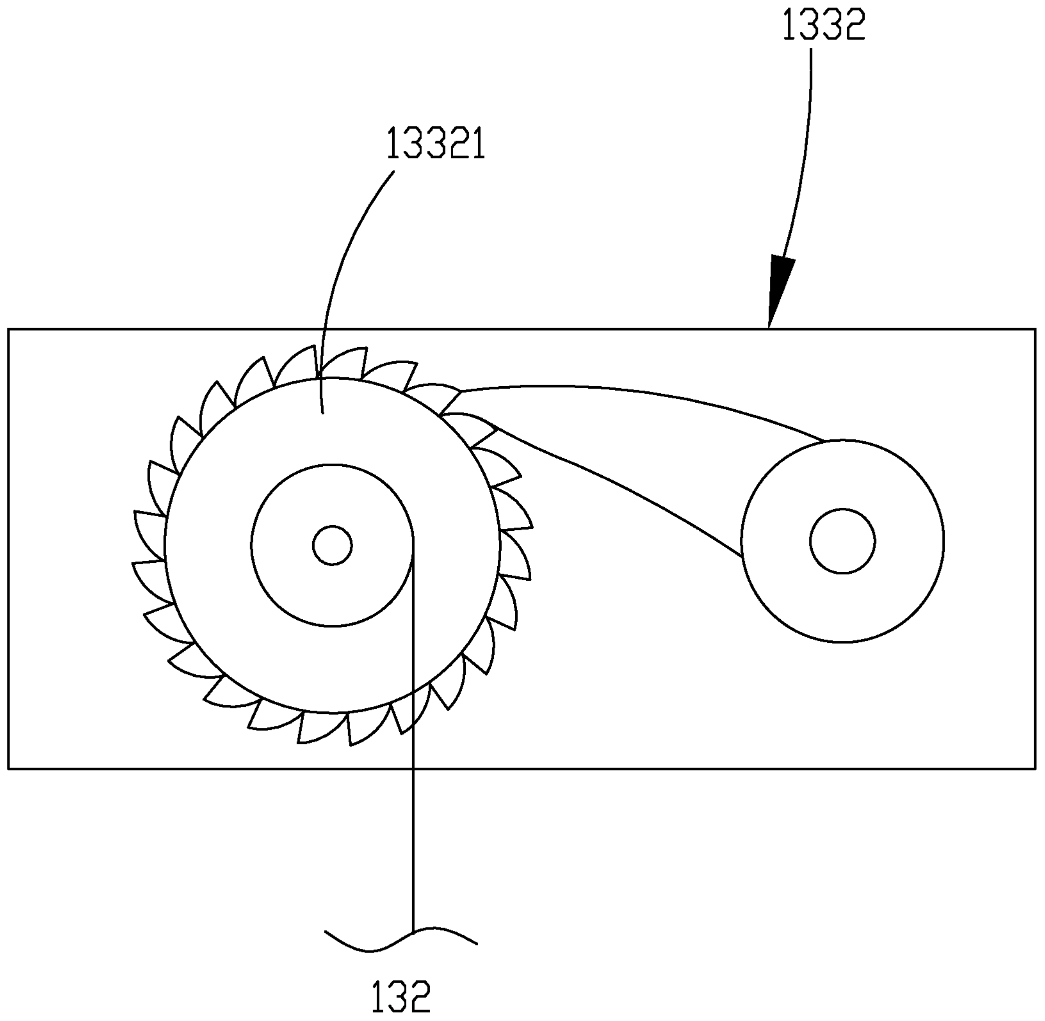
FIG. 4 is a schematic diagram of an anti-reverse mechanism of the channel machining equipment according to the present invention.
Figure 5:
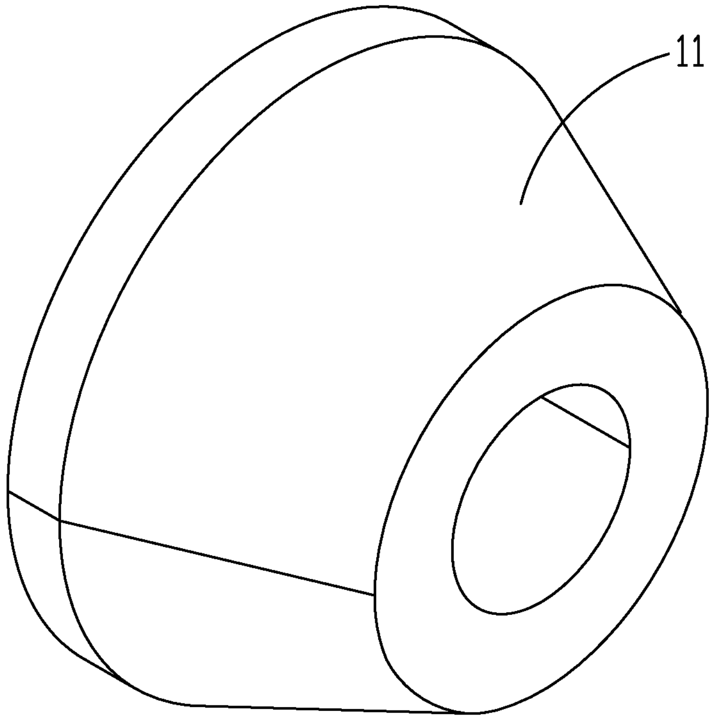
FIG. 5 is a schematic diagram of an electrode of the channel machining equipment according to a first embodiment of the present invention.
Figure 6:
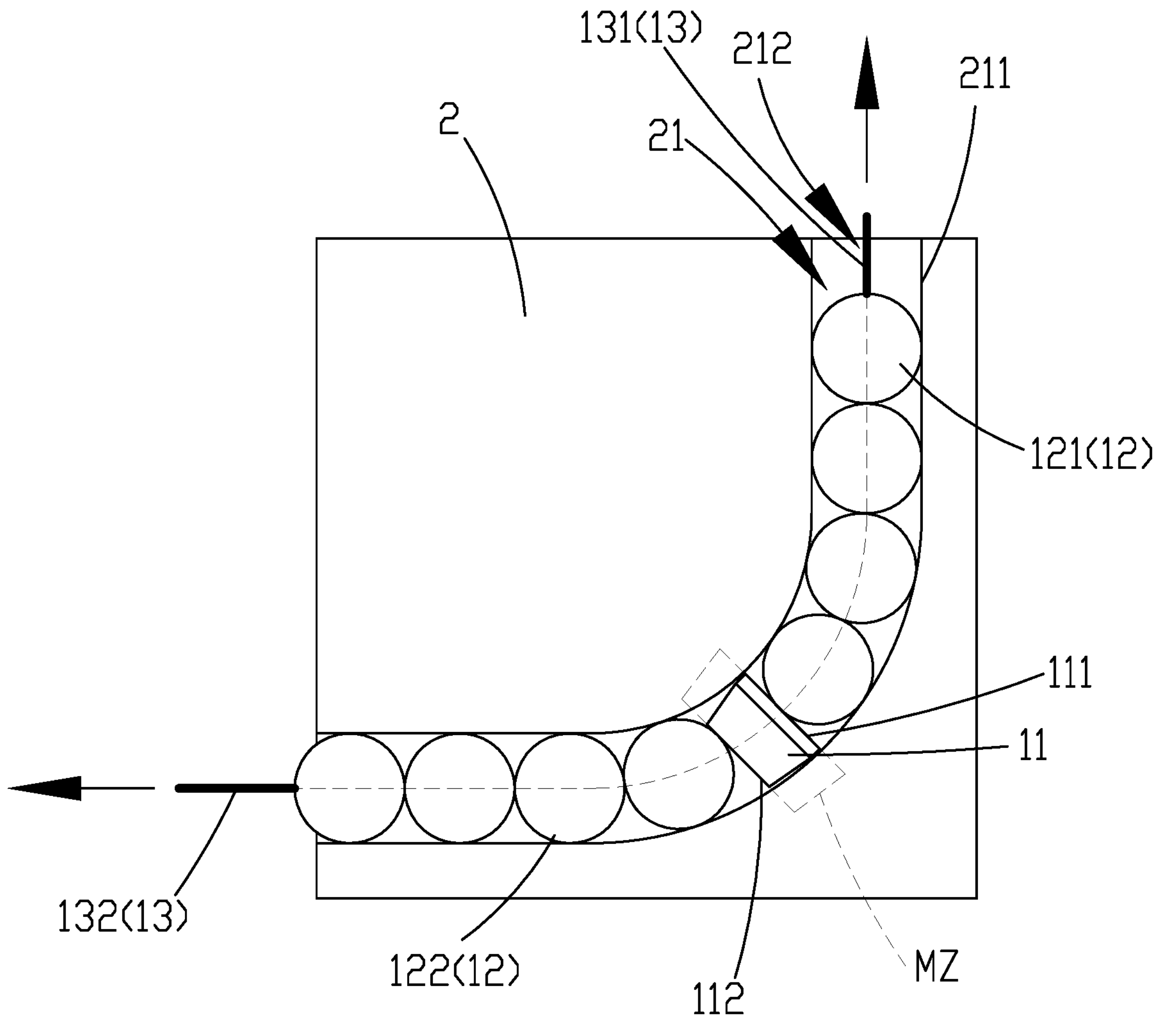
FIG. 6 is a schematic diagram showing a usage status of the electrode in FIG. 5.
Figure 7:
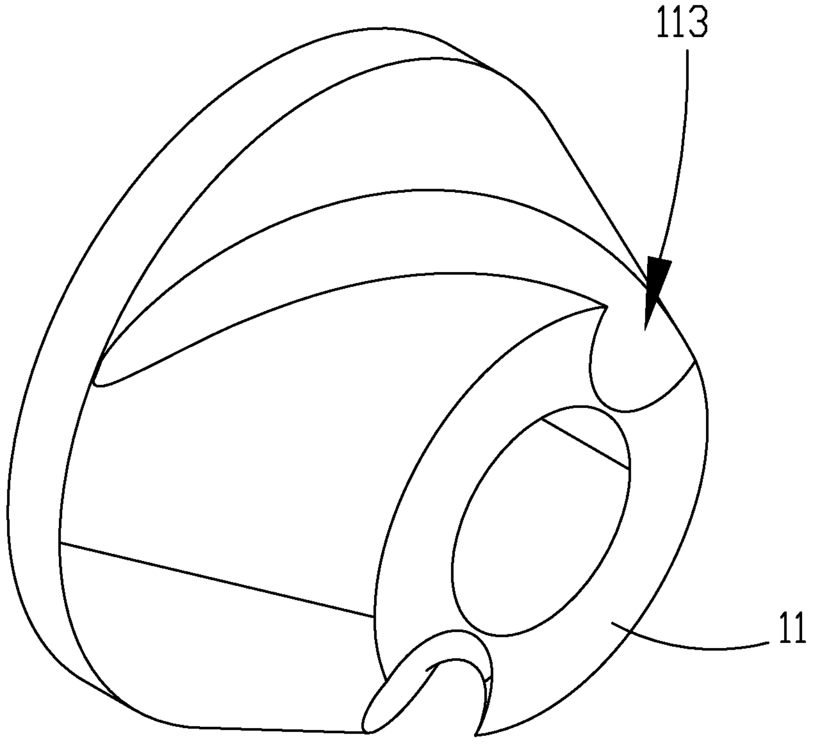
FIG. 7 is a schematic diagram of the electrode of the channel machining equipment according to a second embodiment of the present invention.

In an embodiment shown in FIGS. 1 to 11, a channel machining equipment 1 is provided. The channel machining equipment 1 includes an electrode 11, a guide mechanism 12, a traction mechanism 13, a power supply 14 and an actuating mechanism 16. The electrode 11 is used to perform an EDM process, and includes a first end 111 and a second end 112. The electrode 11 can be shaped flexibly in accordance with the shape of the internal curved channel 21 of the workpiece 2. In the embodiments of FIGS. 3, 5 and 7, the electrode 11 can be a spherical block or a conical block. In the embodiment of FIG. 1, the power supply 14 and the actuating mechanism 16 are serially connected to the traction mechanism 13, and the power supply 14 and the actuating mechanism 16 are mounted on an EDM machine where they can get electricity and kinetic energy.

Figure 8:
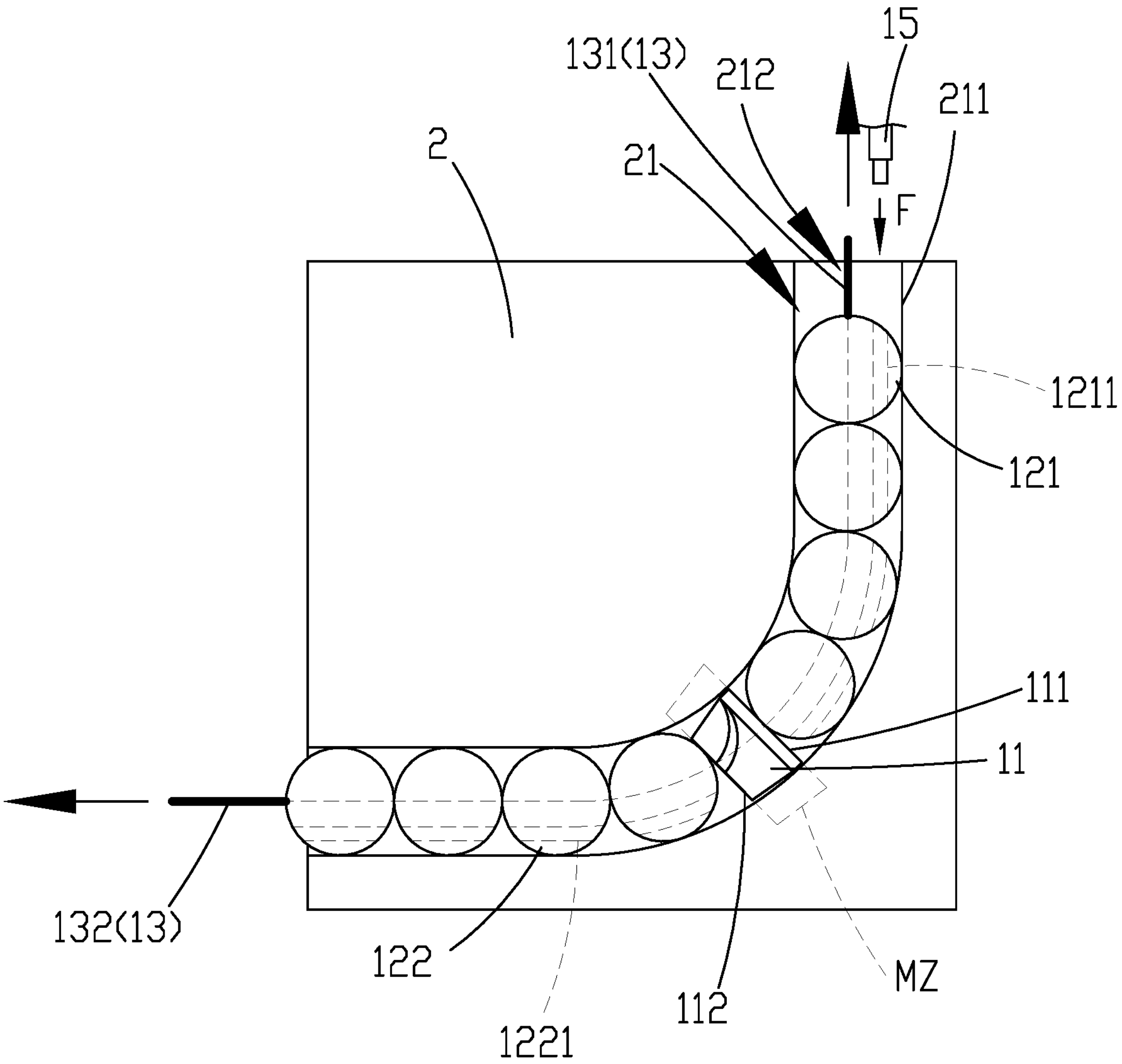
FIG. 8 is schematic diagrams showing usage statuses of the electrode in FIG. 7.
Figure 10:
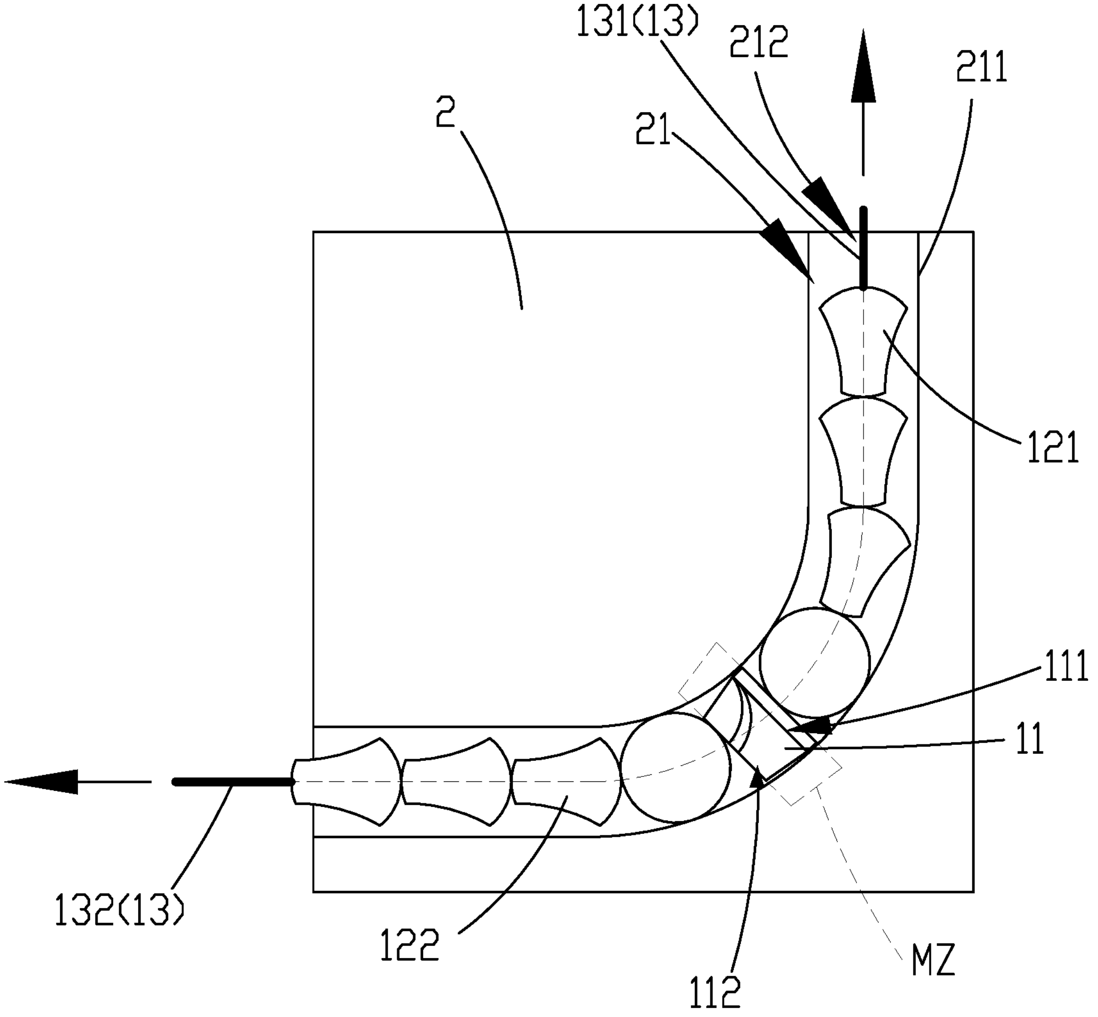
FIG. 10 is a schematic diagram showing a guide is a conical block according to an embodiment of the present invention.

In the embodiment of FIG. 3, the guide mechanism 12 includes a first guide 121 and a second guide 122, which can be made of an insulating material. The first guide 121 and the second guide 122 are respectively close to the first end 111 and the second end 112 of the electrode 11. The first guide 121 and the second guide 122 can be shaped flexibly in accordance with the shape of the internal curved channel 21 of the workpiece 2. In the embodiments of FIGS. 6, 8 and 10, the first guide 121 and the second guide 122 can respectively be a spherical block or a conical block.

The traction mechanism 13 serially connects the first guide 121, the second guide 122 and the electrode 11 together, making them able to move simultaneously. The actuating mechanism 16 is serially connected to the traction mechanism 13 and can provide kinetic energy for the traction mechanism 13. Particularly, when the electrode 11 is performing the EDM process, the actuating mechanism 16 provides kinetic energy for the traction mechanism 13, making the traction mechanism 13 able to tow the first guide 121, the second guide 122 and the electrode 11 to move in the channel 21. The traction mechanism 13 includes a first traction line 131 and a second traction line 132, wherein the first traction line 131 and the second traction line 132 are respectively connected to the first end 111 and the second end 112 of the electrode 11. When the electrode 11 is performing the EDM process, the first traction line 131 can provide a traction force to pull the first end 111 of the electrode 11 or the second traction line 132 can provide a traction force to pull the second end 112 of the electrode 11 so as to allow the electrode 11 to move back and forth in the curved channel 21. At the same time, the power supply 14 provides electricity for the electrode 11 via the traction mechanism 13, such that the electrode 11 can perform the EDM process on the wall 211 of the internal curved channel 21 of the workpiece 2 to allow it to undergo a desirable machining process (such as grinding, EDM, and so on).

It should be noted that, in the embodiment of FIG. 1, the first traction line 131 or the second traction line 132 is an electric wire, such that the power supply 14 can supply electricity to the electrode 11 via the first traction line 131 or the second traction line 132. The actuating mechanism 16 can provide kinetic energy for the traction mechanism 13, making its first traction line 131 or second traction line 132 able to perform the above towing process. Moreover, the traction mechanism 13 selectively includes a traction force retaining structure 133 for tightening the first traction line 131 and the second traction line 132 to keep the traction forces of the first and second traction lines 131, 132 as desired.

In the embodiment of FIG. 1, the traction force retaining structure 133 includes a pulley set 1331 and an anti-reverse mechanism 1332. The pulley set 1331 includes a movable pulley 13311 and a plurality of fixed pulleys 13312. The anti-reverse mechanism 1332 and the movable pulley 13311 are connected to the actuating mechanism 16 such that these three components have linked movement.

In the embodiment of FIGS. 1 to 2, the pulley set 1331 operates as follows. When the actuating mechanism 16 moves from position P1 to position P2, its kinetic energy can make the first traction line 131 of the traction mechanism 13 moved downwards (or upwards) by distance D1, and the movable pulley 13311 moves along with the actuating mechanism 16 from position P3 to position P4. The fixed pulleys 13312 can change an extension direction of the second traction line 132 of the traction mechanism 13 to make the second traction line 132 moved upwards (or downwards) by distance D1, thereby keeping the first traction line 131 and the second traction line 132 tightened and their traction forces substantially constant.

The anti-reverse mechanism 1332 operates as follows. In the embodiment of FIGS. 1 to 2 and 4, the anti-reverse mechanism 1332 further includes a ratchet 13321. When the kinetic energy of the actuating mechanism 16 makes the first traction line 131 of the traction mechanism 13 moved downwards (or upwards) by distance D1, the anti-reverse mechanism 1332 moves along with the actuating mechanism 16 and allows the ratchet 13321 to stop reverse retraction of the second traction line 132, such that the overall length of the first and second traction lines 131, 132 substantially remains constant. Thus, the first traction line 131 and the second traction line 132 are kept tightened and their traction forces are substantially constant.

When the traction mechanism 13 is performing the towing process, the first guide 121 or the second guide 122 is supported by the wall of the curved channel 21 and thus drives the electrode 11 to substantially move along the central portion of the curved channel 21. In such a case, even if the curved channel 21 has curvature and is not straight, the first guide 121 or the second guide 122 in the embodiment of FIG. 5 can still be supported by the wall 211 of the curved channel 21, making the electrode 11 stay substantially in the central portion 212 of the curved channel 21 and perform the EDM process on the wall 211 of the curved channel 21. It should be noted that, as the electrode 11 substantially moves along the central portion 212 of the curved channel 21, it can optimize an EDM effect on the wall 211 of the curved channel 21, thereby allowing a precision machining process to be conducted on the wall 211 of the curved channel 21 in the workpiece 2 to make the curved channel 21 have satisfactory wall roughness and shape/size preciseness according to predetermined standards.

Figure 9:
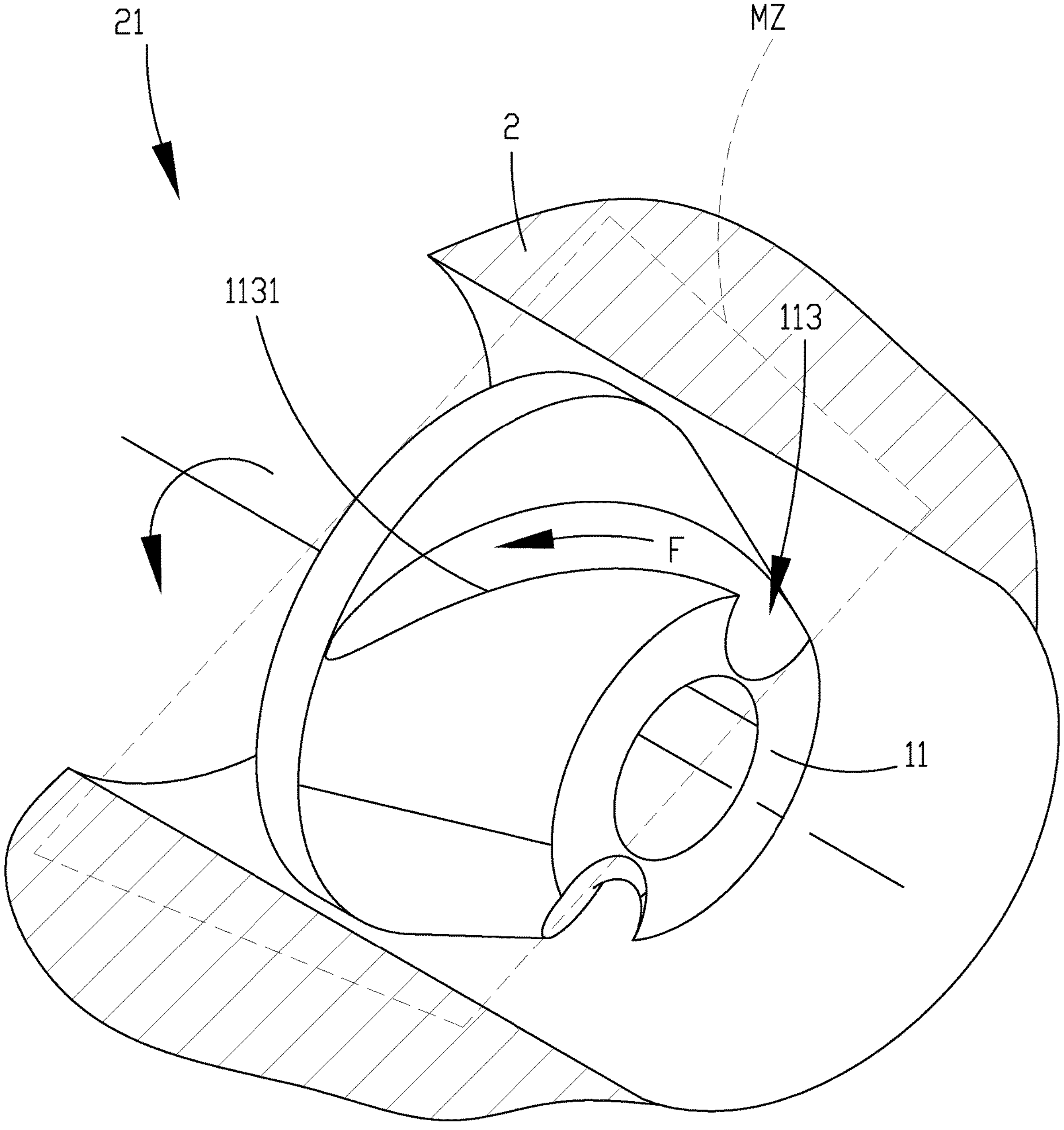
FIG. 9 is schematic diagrams showing usage statuses of the electrode in FIG. 7.

In the embodiment of FIG. 8, the channel machining equipment 1 further includes an EDM fluid providing module 15 for providing an EDM fluid F. The first guide 121 and the second guide 122 respectively includes a first runner 1211 and a second runner 1221 for the EDM fluid F to flow through. In the embodiment of FIG. 7, the electrode 11 further includes at least one groove structure 113 on its surface, wherein the groove structure 113 is specially designed with a push surface 1131. When the EDM fluid F is flowing in the groove structure 113 as shown in FIGS. 8 to 10, the push surface 1131 allows the EDM fluid F to push the electrode 11 to rotate in the curved channel 21. The electrode 11 rotating in the curved channel 21 during the EDM process can enlarge a channel diameter of the curved channel 21 of the workpiece 2 and thus achieves uniform EDM on the wall 211 of the curved channel 21, thereby optimizing the EDM effect on the wall 211 of the curved channel 21 and improving shape/size preciseness of the curved channel 21.

Figure 11:
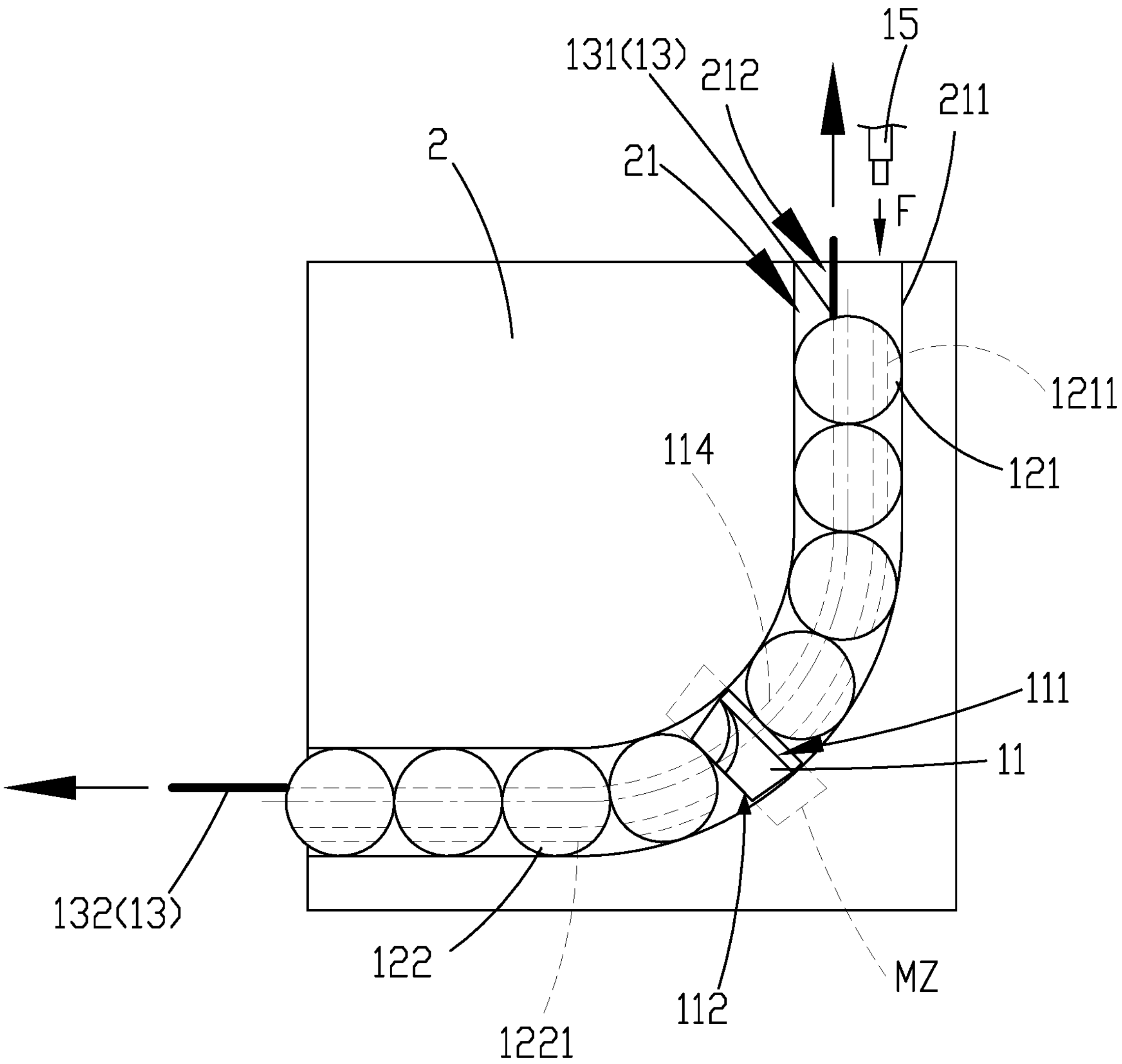
FIG. 11 is schematic diagrams showing usage statuses of the electrode in FIG. 7.

In the embodiment of FIG. 11, the electrode 11 includes an eccentric connection portion 114 at an eccentric location, and the traction mechanism 13 is connected to the eccentric connection portion 114 that allows the traction mechanism 13 to eccentrically tow the electrode 11 to move in a larger range within the curved channel 21, such that an EDM range MZ where the electrode 11 performs the EDM process on the wall 211 of the curved channel 21 of the workpiece 2 can be enlarged, thereby further improving the EDM effect on the wall 211 of the curved channel 21.

Moreover, the present invention further proposes a channel machining method. In the method according to the embodiment of FIG. 3, firstly an electrode 11 for performing an EDM process is provided, which has a first end 111 and a second end 112. Then, a guide mechanism 12, which includes for example a first guide 121 and a second guide 122, is provided, wherein the first guide 121 and the second guide 122 are respectively close to the first end 111 and the second end 112 of the electrode 11. When the electrode 11 is performing the EDM process, the first guide 121 or the second guide 122 of the guide mechanism 12 is supported by a wall 211 of a curved channel 21 in a workpiece 2 and thus drives the electrode 11 to substantially move along a central portion 212 of the curved channel 21, such that the electrode 11 can substantially stay in the central portion 212 of the curved channel 21 to perform the EDM process on the wall 211 of the curved channel 21 of the workpiece 2.

Therefore, according to the channel machining equipment and the channel machining method of the present invention, with the guide mechanism being supported by the wall of the curved channel in the workpiece, the electrode linked to the guide mechanism can substantially move in the central portion of the curved channel so as to optimize the EDM effect on the wall of the curved channel, such that a precision machining process (such as grinding, EDM and so on) can be conducted on the curved channel in the workpiece to make it have satisfactory wall roughness and shape/size preciseness according to predetermined standards, thereby solving the problem of failure in effectively machining the wall of the curved channel in the workpiece in the prior art.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

The invention claimed is:

1. A channel machining equipment for performing electrical discharge machining (EDM) on a curved channel in a workpiece, the channel machining equipment includes:

an electrode for performing an EDM process and having a first end and a second end;

a first guide close to the first end of the electrode;

a second guide close to the second end of the electrode;

a traction mechanism for serially connecting the first guide, the second guide, and the electrode;

an actuating mechanism serially connected to the traction mechanism; and a power supply serially connected to the traction mechanism; wherein, when the electrode performs the EDM process, the actuating mechanism provides kinetic energy for the traction mechanism to allow the traction mechanism to perform a towing process that tows the first guide, the second guide, and the electrode to move in the curved channel, wherein when the traction mechanism performs the towing process, the first guide or the second guide is supported by a wall of the curved channel to drive the electrode to substantially move along a central portion of the curved channel, and simultaneously the power supply provides electricity for the electrode via the traction mechanism to make the electrode substantially stay in the central portion of the curved channel to perform the EDM process on the wall of the curved channel.

2. The channel machining equipment, according to claim 1, wherein the traction mechanism includes a first traction line and a second traction line, wherein the first traction line is connected to the first end of the electrode, and the second traction line is connected to the second end of the electrode; wherein when the electrode performs the EDM process, the first traction line provides a traction force at the first end of the electrode or the second traction line provides a traction force at the second end of the electrode to tow the electrode to move back and forth in the curved channel.

3. The channel machining equipment, according to claim 2, wherein the first traction line or the second traction line is an electric wire, and the power supply provides electricity for the electrode via the first traction line or the second traction line.

4. The channel machining equipment, according to claim 2, wherein the traction mechanism further includes a traction force retaining structure for keeping the traction force of the first traction line and the traction force of the second traction line constant.

5. The channel machining equipment, according to claim 4, wherein the traction force retaining structure includes a pulley set and an anti-reverse mechanism, wherein the pulley set includes a movable pulley and at least one fixed pulley, and the anti-reverse mechanism includes a ratchet, wherein the anti-reverse mechanism and the movable pulley are connected to the actuating mechanism to have linked movement; wherein when the actuating mechanism has kinetic energy make the first traction line moved by a predetermined distance, the movable pulley moves along with the actuating mechanism, and the fixed pulley changes an extension direction of the second traction line to make the second traction line moved by the predetermined distance, and the anti-reverse mechanism stops reverse retraction of the second traction line, so as to allow an overall length of the first and second traction lines to substantially remain constant and keep the traction forces of the first and second traction lines substantially constant.

6. The channel machining equipment, according to claim 1, wherein the first guide, the second guide or the electrode is a spherical block or a conical block.

7. The channel machining equipment, according to claim 1, further includes an EDM fluid providing module for providing an EDM fluid, wherein the first guide includes a first runner for the EDM fluid to flow through, and the second guide includes a second runner for the EDM fluid to flow through.

8. The channel machining equipment, according to claim 7, wherein the electrode further includes at least one groove structure on a surface thereof, wherein the groove structure has a push surface for allowing the EDM fluid to push the electrode to rotate in the curved channel when the EDM fluid flows in the groove structure, so as to allow the electrode to achieve a uniform EDM effect on the wall of the curved channel in the workpiece.

9. The channel machining equipment, according to claim 1, wherein the electrode further includes an eccentric connection portion, wherein the traction mechanism is connected to the eccentric connection portion that allows the traction mechanism to eccentrically tow the electrode to move in an increased range within the curved channel, so as to enlarge an EDM range where the electrode performs the EDM process on the wall of the curved channel in the workpiece.

* * * * *